United States Patent [19]
Matsumoto et al.

[11] Patent Number: 6,053,742
[45] Date of Patent: Apr. 25, 2000

[54] SCREW-FIXED ROTARY CONNECTOR STRUCTURE FOR VEHICLES

[75] Inventors: Tsuyoshi Matsumoto; Kouichi Someya, both of Tokyo, Japan

[73] Assignee: Niles Parts Co., Ltd, Tokyo, Japan

[21] Appl. No.: 09/030,816

[22] Filed: Feb. 26, 1998

Related U.S. Application Data

[62] Division of application No. 08/711,939, Sep. 4, 1996, Pat. No. 5,766,019.

[30] Foreign Application Priority Data

Sep. 8, 1995 [JP] Japan ..................... 7-256822

[51] Int. Cl.[7] .................................... H01R 39/00
[52] U.S. Cl. .................... 439/15; 439/164; 200/61.54
[58] Field of Search ............. 439/15, 164, 564; 280/731, 771, 775; 200/61.54

[56] References Cited

U.S. PATENT DOCUMENTS

| | | | |
|---|---|---|---|
| 4,040,715 | 8/1977 | Debaigt | 439/813 |
| 5,248,260 | 9/1993 | Ida et al. | 439/15 |
| 5,501,614 | 3/1996 | Tsuchiya | 439/574 |
| 5,769,649 | 6/1998 | Welschholz et al. | 439/15 |
| 5,813,875 | 9/1998 | Ishikawa et al. | 439/15 |
| 5,828,021 | 10/1998 | Uchiyama et al. | 200/61.54 |
| 5,847,342 | 12/1998 | Uchiyama et al. | 439/15 |

*Primary Examiner*—Gary F. Paumen
*Assistant Examiner*—Tho D. Ta
*Attorney, Agent, or Firm*—Ronald P. Kananen; Rader, Fishman & Grauer

[57] ABSTRACT

A rotary connector 1 has a fixed case 3 for being mounted on a base 5 for a switch 4. The fixed case 3 has a first screw insertion hole 3a formed open therein for insertion of a screw 6. The screw 6 has a flange 6a. The fixed case 3 or the base 5 has a resilient pawl 3f formed therein for engagement with the flange 6a. With such structure, it is possible to screw-fix both the rotary connector and the base onto the steering column. The screw is securely kept in the rotary connector during transport and assembly by the resilient pawl.

9 Claims, 5 Drawing Sheets

SCREW-FIXED ROTARY CONNECTOR STRUCTURE FOR VEHICLES

This application is a divisional of application Ser. No. 08/711,939 filed Sep. 4, 1996 now U.S. Pat. No. 5,766,019.

BACKGROUND OF THE INVENTION

1. Field of the Invention

This invention relates generally to rotary connector structures and, more particularly, to a screw-fixed rotary connector structure for vehicles, in which a rotary connector is screw-fixed to a base having a switch, such as a turn-signal switch, mounted thereon.

2. Description of the Prior Art

A conventional rotary connector is disclosed by Published Examined Japanese Utility Model Application No. H3-48867. According to the disclosure, the rotary connector is fixed by fastening screws onto a turn-signal switch, after inserting four screws into through-holes provided therein. In the meanwhile, the turn-signal switch is fixed by screwing onto a steering column after inserting separate three or more screws into screw holes provided therein.

In the conventional arrangement, however, the rotary connector is screw-fixed onto the base for the turn-signal switch, and the base is fixed onto the steering column by using other screws, thus increasing the number of screws as well as the number of processes of screw fastening. This results in an increased manufacturing cost. Further, since the conventional technique necessitates screw-fastening operations in very narrow locations, as in the periphery of the steering column for an automobile, it is difficult to insert screws into the screw holes in the rotary connector and the base. This difficulty often results in dropping the screws by mistake.

SUMMARY OF THE INVENTION

The present invention has been made in order to solve the above-stated problems encountered in the conventional art.

It is therefore an object of the present invention to reduce the number of screws and processes of fastening screws for simplification of screw-fastening operations in a rotary connector, by fixing the rotary connector and the turn-signal switch base using common screws attached to the rotary connector.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

According to the present invention, there is provided a screw-fixed rotary connector structure for vehicles comprising a rotary connector having a first screw insertion hole formed open for insertion of a screw therethrough, a fixed case for being mounted on a base for a switch, a flange formed on the screw, and a resilient pawl formed on the fixed case or the base for engagement with the flange.

There is also provided a screw-fixed rotary connector structure for vehicles comprising a rotary connector having a first screw insertion hole opened for insertion of a screw therethrough, a fixed case for being mounted on a base for a switch, and a resilient pawl formed in the fixed case or the base for engagement with a threaded portion of the screw.

The screw-fixed rotary connector structure for vehicles of the invention may further comprise an engaging piece formed in either one of the rotary connector or the base, an engaging portion formed in the other of the rotary connector and the base for engagement with the engaging piece, and a second screw insertion hole formed open in the base for insertion of the screw, the second screw insertion hole being provided in a same axis as that of the first screw insertion hole of the rotary connector.

The flange according to the present invention may comprise a washer inserted on a threadless cylindrical portion of the screw.

The resilient pawl according to the present invention may be provided adjacent to or in the first screw insertion hole or the second screw insertion hole.

The screw according to the present invention may have a head and a flange thereof positioned in the first screw insertion hole.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

First, explanation will be made in detail on a screw-fixed rotary connector structure for vehicles according to a preferred first embodiment of the present invention, by referring to FIGS. 1 and 2.

Reference numeral 1 represents a rotary connector which is doughnut-shaped to accommodate therein a cable reel, not shown. The rotary connector 1 is constituted by a rotatable case 2 for engagement with a steering wheel, not shown, and a fixed case 3 secured to a base 5 for mounting thereon a switch 4, such as a turn-signal switch.

The rotary case 2 has a top surface having a pair of projecting rods 2a for engagement with blind holes, not shown, formed in the bottom face of the steering wheel, and a connector 2b connected to one end of the cable reel accommodated within the rotary connector 1. The rotatable case 2 is rotatably engaged with the fixed case 3. The rotatable case 2 is allowed to rotate with rotation of the steering wheel through the projecting rods 2a fitted thereto.

The fixed case 3 has a plurality of downwardly extending protuberances 3b each formed with a first screw insertion hole 3a. The first screw insertion holes 3a are aligned with second screw insert on holes 5a formed in the base 5. The fixed case 3 also has a connector 3c which extends downward for connection to the other end of the cable reel accommodated in the rotary connector 1. By placing horizontal planar surfaces 3d respectively formed at the lower ends of the protuberances 3b onto ear portions 5c of the base 5, the fixed case 3 is arranged at a desired location over the base 5 for rotation of a ratchet 4a and a maneuver lever 4c. The fixed case 3, together with the base 5, is fixed onto a steering column 7 by fastening screws into screw holes 7a formed in the steering column 7.

The first screw insertion holes 3a are each opened at a lower end of a protuberance 3b in a center axis common to a second screw insertion hole 5a. The first screw insertion hole 3a and the second screw insertion hole 5a have their inner diameters larger than an outer diameter of a threaded portion 6b of the screw 6 so that the threaded portion 6b is freely inserted therethrough. Incidentally, a larger diameter portion 3i may be formed in the first screw insertion hole 3a in a thickened planar portion 3d so that a flange 6a and a head 6c of the screw 6 sink therein, in a manner similar to a first screw insertion hole 3h of a third embodiment shown in FIG. 6, as described below.

The protuberances 3b project downward from a plurality of areas in the periphery of the fixed case 3 to have respective planar portions 3d at lower ends thereof formed with a first screw insertion hole 3a. The protuberance 3b is in a semicylindrical form so as to engage with a curvedly surfaced cutout 5b formed in the vicinity of the second screw insertion hole 5a.

A resilient pawl 3f is formed on the planar portion 3d in a manner surrounding the first screw insertion hole 3a for engagement with the flange 6a of the screw 6. Meanwhile, a plurality of engaging pieces 3e are formed in the periphery of the fixed case 3 to project downward therefrom. Each engaging piece 3e has a claw at a tip thereof for engagement with an engaging portion 5d. A plurality of the engaging portions 5d are formed on the top surface of the base 5. The engaging portion 5d comes to engagement with the engaging piece 3e upon inserting the protuberance 3b along the cutout 5b to register the planar portion 3d with the ear portion 5c, thereby engaging the rotary connector 1 with the base 5. Incidentally, the engaging piece 3e and the engaging portion 5d may respectively be provided in the base 5 and the fixed case 3.

The resilient pawl 3f is an elastic piece with a claw which projects upward from the vicinity of the first screw insertion hole 3a of the planar portion 3d. Alternatively, a plurality of resilient pawls 3f may be provided for each insertion hole 3a. The resilient pawl 3f is formed projecting such that the claw-shaped portion is engageable with the flange 6a of the screw 6, as shown in FIG. 2. The resilient pawl 3f has an engaging face, against which the flange 6a abuts, provided at a height H1 with respect to the planar portion 3d. If the distance over which the screw 6 inserted in the first screw insertion hole 3a is movable is expressed as S1, and the thickness of the flange 6a is expressed as T1, the height H1 of the resilient pawl 3f can be expressed as:

$$H1=S1+T1$$

Figure 1:
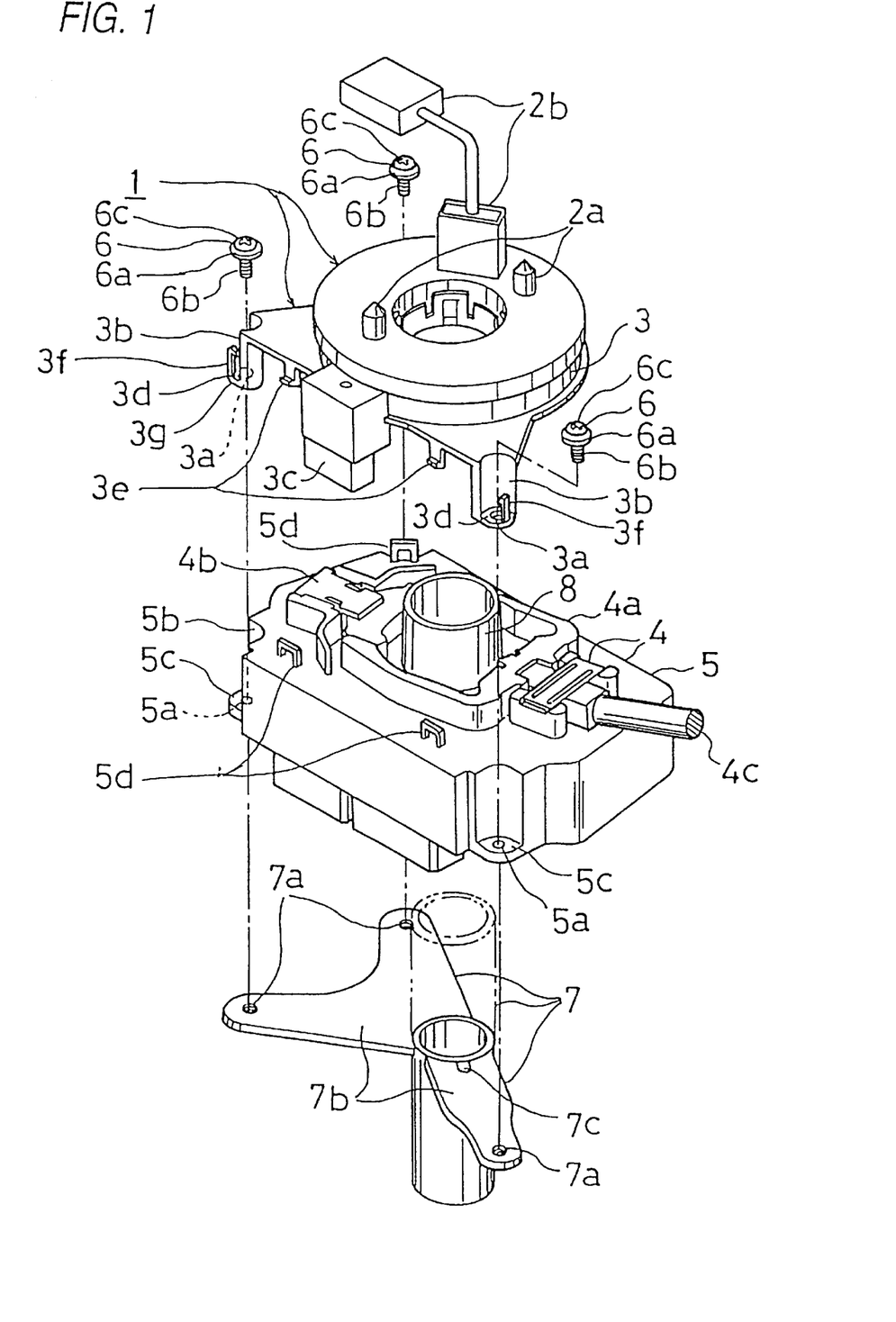
FIG. 1 is an exploded perspective view showing a first embodiment of the present invention.
Figure 2:
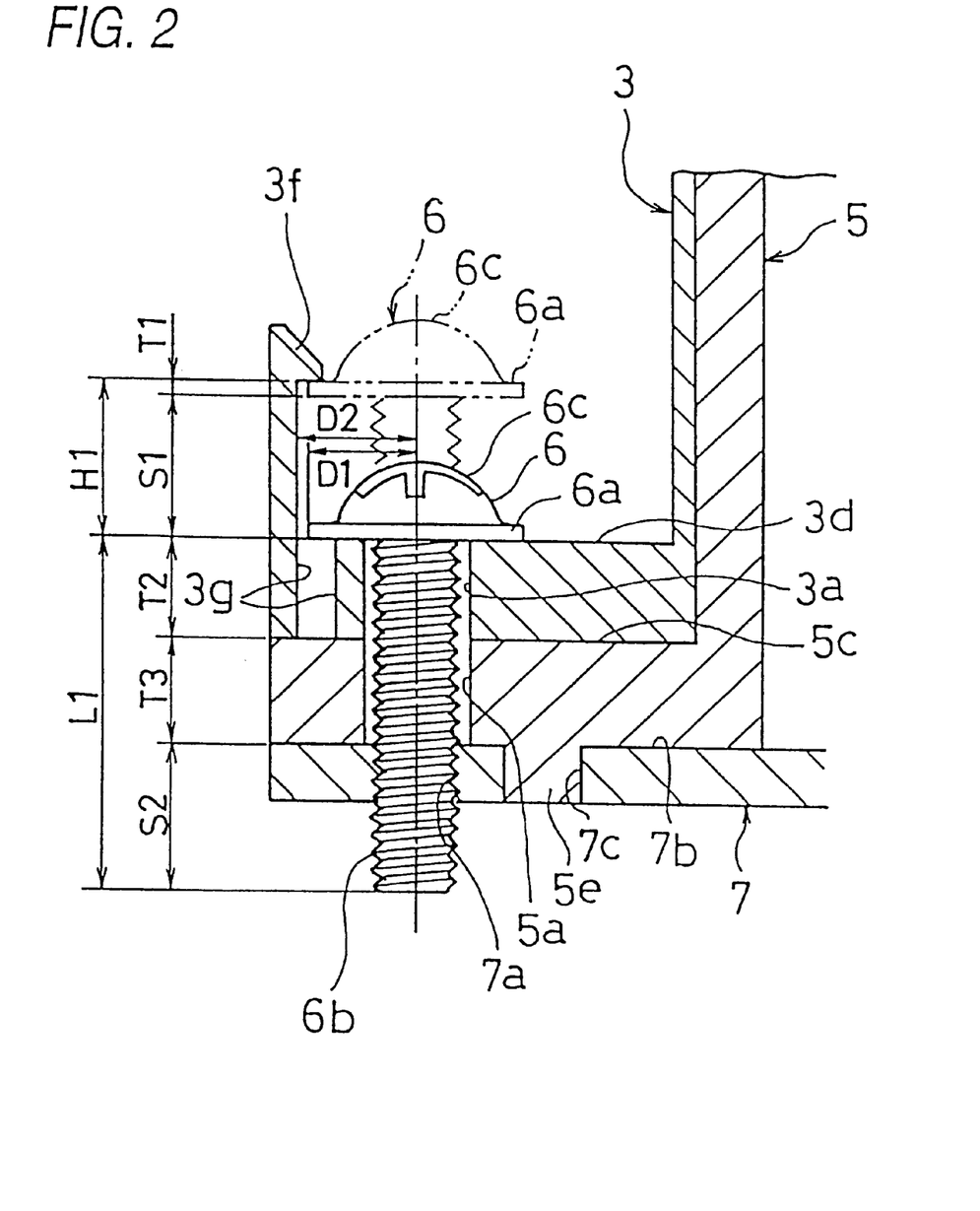
FIG. 2 is an essential-part enlarged sectional view showing the first embodiment of the present invention.
Figure 3:
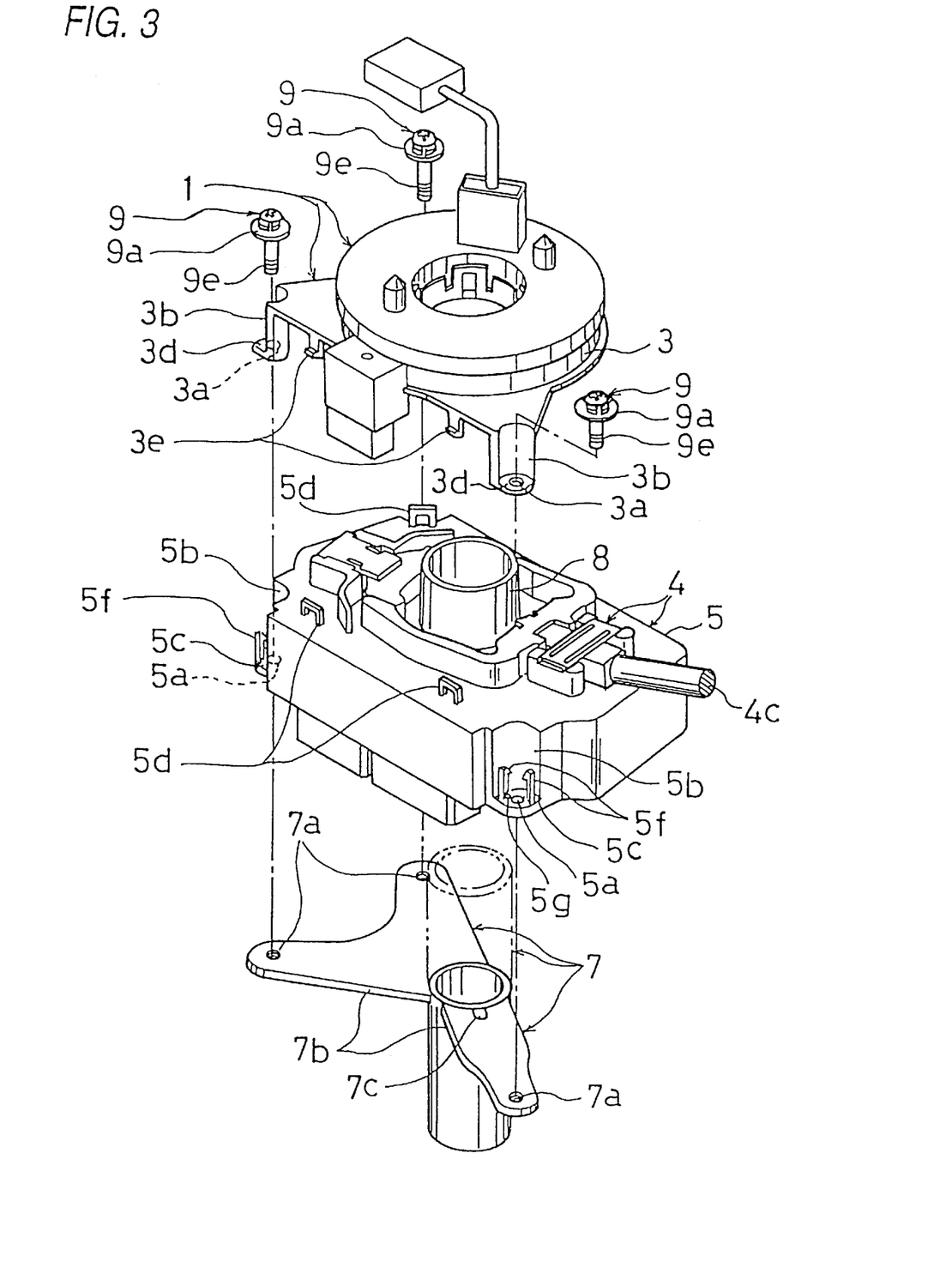
FIG. 3 is an exploded perspective view showing a second embodiment of the present invention.
Figure 4:
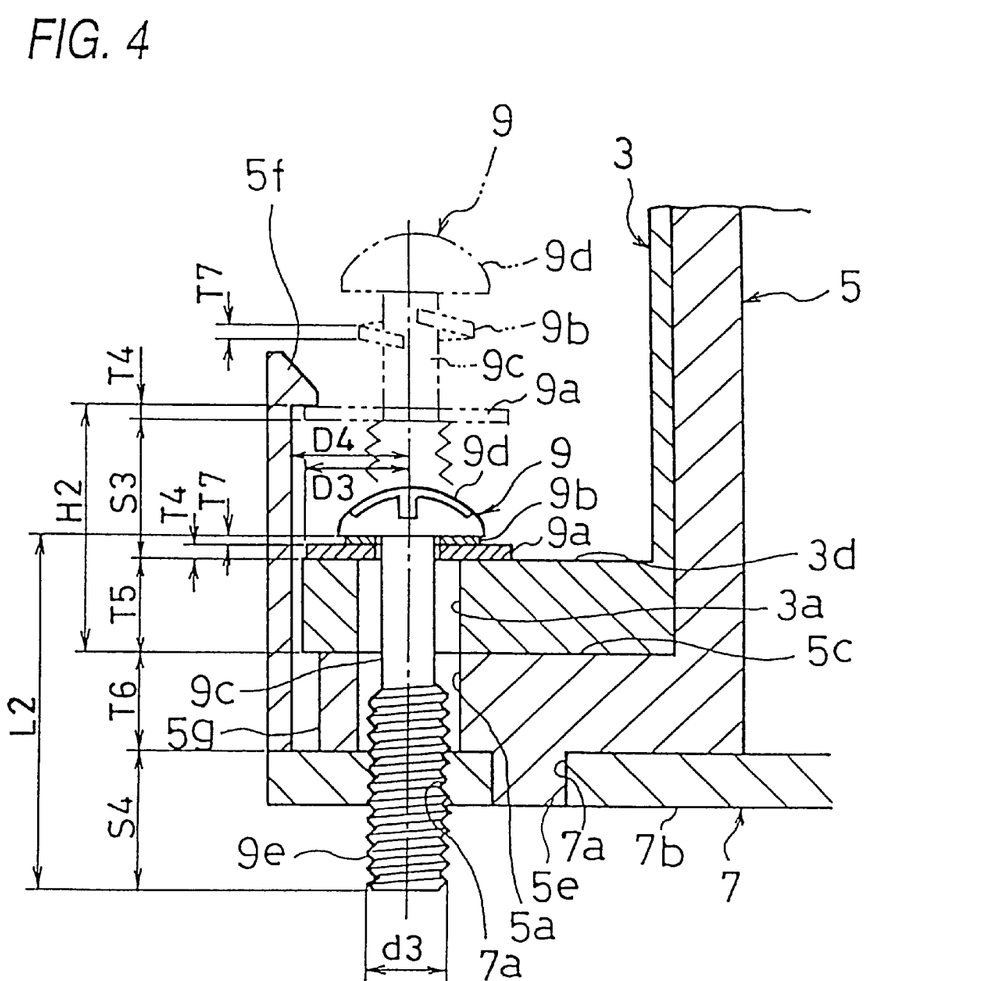
FIG. 4 is an essential-part enlarged sectional view showing the second embodiment of the present invention.

The screw 6 is formed by a flanged machine screw or a flanged screw bolt, wherein a flange 6a thereof is integrally formed, as shown in FIGS. 1 and 2. Incidentally, the screw 6 may be a machine screw having a flange 9a comprising a washer, as shown in FIGS. 3 and 4. The flange 6a has a diameter D1 which is slightly smaller than the distance D2 from a center axis of the first screw insertion hole 3a to the resilient pawl 3f so that the flange 6a at its peripheral portion comes to engagement with the resilient pawl 3f. The shape of the head 6c for the screw 6 is not limited, and may be flattened or peaked.

If the thickness of the planar portion 3d is T2, the thickness of the ear portion 5c is T3, the length of the threaded portion 6b threaded into a bracket 7b is S2, and the length of the threaded portion 6b is L1, then the following relations will stand in relation to the distance S1 over which the screw 6 inserted in the first screw insertion hole 3a is allowed to move:

(1) $0<S1\leq S2$ (2) $L1>T2+T3$

This makes possible the prevention against falling of the threaded portion 6b of the screw 6 out of the first screw insertion hole 3a. Also, when the rotary connector 1 and the base 5 are fastened by screwing onto the steering column 7, the threaded portion 6b at its tip threads into the screw hole 7a. Incidentally, it is preferred that the length L1 of the threaded portion 6b be determined to such a value that the threaded portion 6b at its tip is threaded through the underside of the bracket 7b, when the rotary connector 1 and the base 5 are fixed by the screw 6 onto the steering column 7. This enables firm fixing of the rotary connector 1 and the base 5 on the bracket 7b.

The length L1 of the threaded portion 6b or the length H1 of the resilient pawl 3f is adjusted so that the threaded portion 6b does not project at its tip from the underside of the ear portion 5c, where the screw 6 is freely received at its threaded portion 6b in the first screw insertion hole 3a and the second screw insertion hole 5a with the flange 6a abutted against the resilient pawl 3f. This permits the threaded portion 6b to be sunk at its lower end in the second screw insertion hole 5a without interfering with the bracket 7b, when the base 5 having screws 6 and the rotary connector 1 is screwed down to the bracket 7b. In this manner, the screwing operation is facilitated.

Reference character 3g in FIG. 2 is a through-hole formed by insertion of a pin upon die-forming the resilient pawl 3f. The switch 4 is constituted by a turn-signal switch or the like, which includes, for example, a ratchet 4a, a node member 4b, a maneuver lever 4c, and so on. The base 5 has cutouts 5b semi-cylindrically formed, for example, at four corners in the periphery thereof or a plurality of locations. The base 5 also has ear portions 5c formed at respective lower ends of the cutouts 5b, wherein the ear portion 5c has a second screw insertion hole 5a opened therethrough. The base 5 has a cylindrical cancellation member 8 rotatably inserted through a central portion thereof for automatically returning the maneuver lever 4c.

The steering column 7 has brackets 7b formed on the left and right sides. The bracket 7b has screw holes 7a for receiving the screws 6, and a positioning hole 7c for fitting with a positioning projection 5e projecting from the underside of the base 5.

The function of the first embodiment constructed as above will next be described by referring to FIGS. 1 and 2.

To screw-fix the rotary connector 1 and the base 5 onto the steering column 7, the protuberances 3b are first inserted respectively along the cutouts 5b, and planar portions 3d are pressed down to register with the ear portions 5c. This causes alignment of the first screw insertion hole 3a and the second screw insertion hole 5a in their centers, integrating together the rotary connector 1 and the base 5.

Then each screw 6 is pushed so that its threaded portion 6b is inserted into the first screw insertion hole 3a. Upon insertion, the screw 6 comes into pressure contact at the flange 6a with the resilient pawl 3f to bend the same with threaded portion 6b freely received in the first screw insertion hole 3a and the second screw insertion hole 5a. Thus, the screw 6 is supported with the flange 6a and the head 6c positioned between the resilient pawl 3f and the planar portion 3d. Therefore, the head 6c of the screw 6 is allowed to move vertically within the distance S1 shown in FIG. 2.

The screw 6 will not fall out of the first and second screw insertion holes 3a, 5a due to abutment of the flange 6a against the resilient pawl 3f, unless the resilient pawl 3f is forcibly bent outward. This makes it possible to transport the screws 6 in a state of being attached to the first and second screw insertion holes 3a, 5a of the rotary connector 1 before mounting the case 3 and the base 5 to the bracket 7b. Thus, the screws are easily controlled and available during mounting.

The base 5 is then placed onto the bracket 7b to align the second screw insertion holes 5a to the respective screw holes 7a while fitting the positioning projections 5e into positioning holes 7c. The fixed case 3 and the base 5 are screw fixed together by fastening screws 6 onto the bracket 7b. It is noted that both the rotary connector 1 and the base 5 are screwed down to the steering column 7 at one time, thereby reducing the number of screws and processes.

Next, a screw-fixed rotary connector structure for vehicles according to a second embodiment of the present invention will be described in detail by referring to FIGS. 3 and 4. The same reference numbers are used in FIGS. 3 and 4 for denoting components of the same configuration as those of the above first embodiment, and a further explanation of those components will be omitted.

The second embodiment of the invention employs screws 9 having a washer, instead of screws 6 with a flange as in the first embodiment, and resilient pawls 5f are provided in an ear portion 5c of the base 5, instead of resilient pawls 3f provided on the fixed case 3 as in the first embodiment.

Each protuberance 3b has solely a first screw insertion hole 3a formed in a planar portion 3d at the tip thereof. In a base 5, two resilient pawls 5f are formed projecting from an ear portion 5c in a manner surrounding a second screw insertion hole 5a provided in the ear portion 5c. The resilient pawls 5 may be either singular or plural in number.

Figure 6:
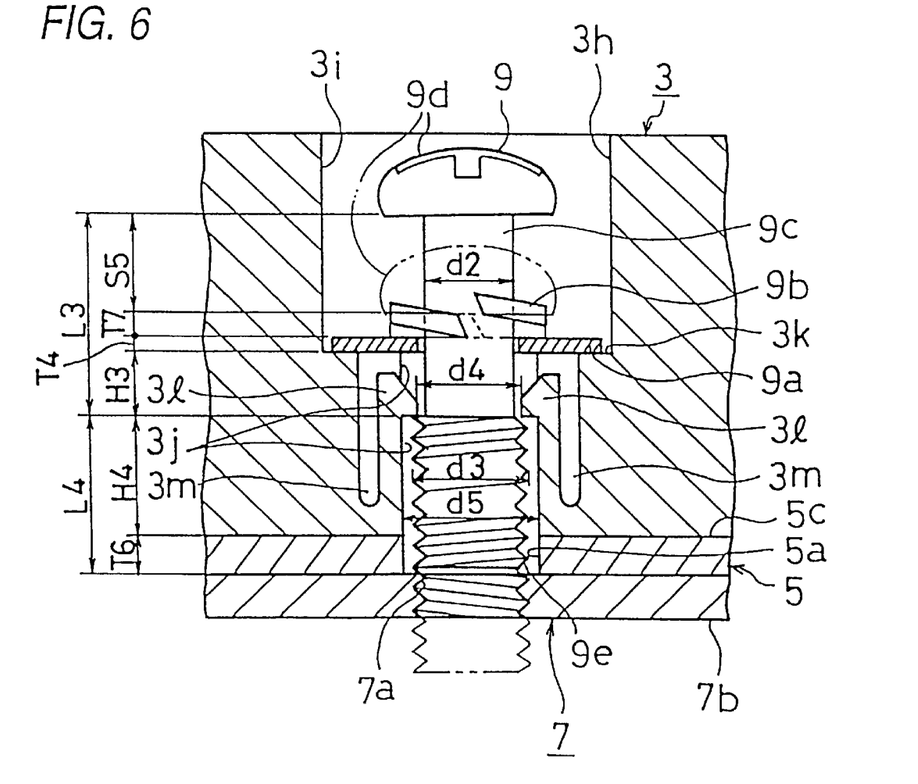
FIG. 6 is an essential-part enlarged sectional view showing the third embodiment of the present invention.

The planar portion 3d becomes interposed between the ear portion 5c and the resilient pawl 5f when the protuberances 3b are inserted along the cutouts 5b so that the planar portions 3d are registered with the ear portions 5c. Alternatively, the first screw insertion hole 3a may be provided in a manner similar to a first screw insertion hole 3h, as shown in FIG. 6 according to the third embodiment explained below. In the alternative embodiment (FIG. 6), the first screw insertion hole 3h has a larger diameter portion 3i by increasing the thickness of the planar portion 3d so as to sink therein a flange 9a, a spring washer 9b, and a head 9d.

The screw 9 is formed by a machine screw with a flange 9a formed with a washer, or a screw bolt constituted with a washer. The screw 9 is formed by roll-threading or the like, and has a spring washer 9b and a flange 9a formed by a plain washer. The plain washer forming the flange 9a is freely but nonremovably received on a threadless cylindrical portion 9c of the screw 9. Alternatively, the screw 9 may be a flanged screw integrally formed with a flange 6a, as in the first embodiment described above. The outer diameter D3 of the flange 9a is slightly smaller than the distance D4 between the center axis of the second screw insertion hole 5a and the resilient pawls 5f. This provides restriction on motion of the screw 9 by engagement at its periphery with the resilient pawl 5f, thereby preventing the spring 9 from falling out of the second screw insertion hole 5a. The shape of the head 9d of the screw 9 is not limited, and may be flattened or peaked.

If the inner diameter of the flange 9a is d1 and the outer diameter of the cylindrical portion 9c is d2, then the outer diameter d3 of the threads in a threaded portion 9e can be expressed as:

d3>d1>d2

By these relative dimensions, the threaded portion 9e is prevented from falling out of the spring washer 9b.

The resilient pawl 5f has a claw-shaped portion formed projecting for abutment against the periphery of the flange 9a, as shown in FIG. 4. The abutment surface of the resilient pawl 5f against the flange 9a is provided at a height H2 with respect to the ear portion 5c.

If the distance over which the screw 9 inserted through the first and second screw insertion holes 3a, 5a is movable is S3, the thickness of the flange 9a is T4, and the thickness of the planar portion 3d is T5, then the height H2 of the abutment surface of the resilient pawl 5f is expressed as:

H2=S3+T4+T5

Reference 5g denotes a through-hole formed by a pin during die-forming of the resilient pawl 5f.

If the thickness of the planar portion 3d is T5, the thickness of the ear portion 5c is T6, the thickness of the spring washer 9b is T7, the length of the threaded portion 9e threaded into a bracket 7b is S4, and the length of the threadless cylindrical portion 9c plus the threaded portion 9e is L2, then the following expressions can be provided in relation to the distance S3 over which the screw 9 inserted in the first and second screw insertion holes 3a, 5a is movable:

(1) 0<S3≦S4

(2) L2>T4+T5+T6+T7

These relative dimensions make it possible to prevent the threaded portion 9e of the screw 9 from falling out of the first and second screw insertion holes 3a, 5a. Also, when the rotary connector 1 and the base 5 are screw-fixed using screw 9 onto the steering column 7, the threaded portion 9e at its tip is screwed into the screw hole 7a. Thus, the rotary connector 1 and the base 5 are fixed together on the steering column 7. Preferably, the length L2 of the cylindrical portion 9c plus the length of the threaded portion 9e is such that the threaded portion 9e at its tip is threaded through the underside of the bracket 7b, as shown in FIG. 4, when the rotary connector 1 and the base 5 are screw-fixed by the screws 9 onto the steering column 7. This enables firm fixing of the rotary connector 1 and the base 5 on the bracket 7b.

The length L2 of the cylindrical portion 9c plus the threaded portion 9e is adjusted so that the threaded portion 9e does not project at the tip thereof from the underside of the ear portion 5c, where the screw 9 is freely received at its threaded portion 9e in the first hole 3a and the second screw insertion hole 5a with its flange 9a abutted against the resilient pawls 5f. This permits the threaded portion 9e to be sunk at its lower end in the second screw insertion hole 5a without interfering with the bracket 7b, when the base 5 having screws 6 and the rotary connector is screwed down to the bracket 7b. Thus, the screwing operation is facilitated.

To screw-fix the rotary connector 1 and the base 5 for a switch 4 onto the steering column 7, the protuberances 3b are first inserted respectively along the cutouts 5b. During the insertion, the planar portions 3d engage and push the respective claws of the resilient pawls 5f to thereby spread the resilient pawls 5f. Then, the engaging pieces 3e each engage with the engaging portion 5d. This causes the planar portions 3d to be registered with the ear portions 5c, to thereby align the first screw insertion hole 3a and the second screw insertion hole 5a in their centers. Thus, the fixed case 3 comes into engagement with the base 5, integrating them together.

Then each screw 9 is pushed into a first screw insertion hole 3a. The screw 9 is freely received at its threaded portion 9e in the first and second screw insertion holes 3a, 5a and the flange 9a thereof is brought in pressure-contact with the resilient pawls 5f to bend them. Thus, the head 9d, flange 9a, and the washer 9b of the screw 9 are held between the resilient pawls 5f and the planar portion 3d. The flange 9a of the screw 9 is permitted vertical movement only within the distance S3 shown in FIG. 4.

The screw 9 will not fall out of the first and second screw insertion hole 3a, 5a by abutment thereof against the resilient pawls 5f, unless the resilient pawls 5f are forcibly bent outward. This makes it possible to transport the screws 9 in a state of being attached to the first and second screw insertion holes 3a, 5a of the rotary connector 1 mounting with the switch 4. Thus, control of screws 9 is unnecessary.

The base 5 is then placed onto the bracket 7b to align the second screw insertion holes 5a to the respective screw holes 7a while fitting the positioning projections 5e into positioning holes 7c. The fixed case 3 and the base 5 are screw-fixed together by fastening screws 9 onto the bracket 7b. The rotary connector 1 and the base 5 are both screwed down to the steering column 7, thereby reducing the number of screws 9 and processes required for screw fastening.

Figure 5:
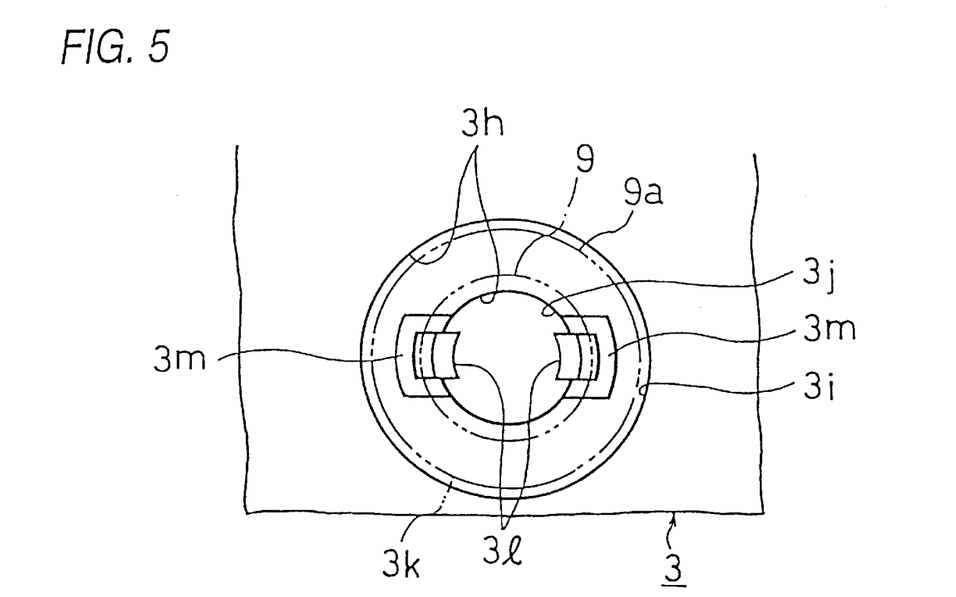
FIG. 5 is an essential-part enlarged plan view showing a third embodiment of the present invention.

Next, a screw-fixed rotary connector structure for vehicles according to a third embodiment of the present invention will be described in detail by referring to FIGS. 5 and 6. The same reference numbers are used to denote the same configured-elements as in the first embodiment described above, and a farther explanation of these elements will be omitted.

The third embodiment of the invention has resilient pawls 3l provided in a first screw insertion hole 3h, instead of the resilient pawls 3f, 5f used in the first and second embodiments, respectively. The screw 9 shown in FIGS. 5 and 6 is formed in the same shape, except that a spring washer 9b is used with a flange 9a formed by a plain washer freely fitted over the threadless cylindrical portion 9c. Alternatively, the screw 9 may be configured in the same shape as the screw 6 of the first embodiment. The screw 9 at its threaded portion 9e is engageable with resilient pawls 3l upon being pressed into a first screw insertion hole 3h.

The first screw insertion hole 3h is opened in a fixed case 3, and comprises a larger diameter portion 3i and a smaller diameter portion 3j. A stepped surface 3k is provided between the larger diameter portion 3i and the smaller diameter portion 3j in the first screw insertion hole 3h, with which the flange 9a is to be pressure-contacted. The larger diameter portion 3i receives a head 9d, a spring washer 9b, and a flange 9a of the screw 9 to allow vertical movement of the screw 9. The smaller diameter portion 3j has an inner wall formed with resilient pawls 3l for engagement with a threaded portion 9e so that the screw 9 is prevented from falling out of the first screw insertion hole 3h.

The resilient pawls 3l are each formed by a resilient piece with a claw extending upwardly from an almost central portion of the smaller diameter portion 3j. The resilient pawls 3l may be singular or plural in number. The resilient pawl 3l has a claw-shaped portion projecting toward the inside of the smaller diameter portion 3j. The resilient pawl 3l has gaps 3m on the back and lateral sides thereof, and accordingly is elastically deformable backward and forward as well as rightward and leftward.

If the outer diameter of the cylindrical portion 9c of the screw 9 is d2, the outer diameter d3 of threaded portion 9e is d3, the inner diameter of the resilient pawls 3l is d4, and the inner diameter of the smaller diameter portion 3j is d5, then the outer diameter d3 of the threaded portion 9e can be expressed as follows:

$$d2<d4<d3<d5$$

As a result of these relative dimensions, the threaded portion 9e is engageable with the resilient pawl 3l.

If the distance between the stepped surface 3k and the surface of engagement of the resilient pawl 3l is H3, the thickness of the flange 9a is T4, the thickness of the ear portion 5c is T6, the thickness of the spring washer 9b is T7, and the distance over which the screw 9 placed in the fixed case 3 is movable is S5, then the length L3 of the cylindrical portion 9c of the screw 9 can be expressed as follows:

$$L3=H3+T4+T7+S5$$

The distance S5 over which the screw 9 attached to the fixed case 3 is movable can be expressed as follows:

$$S5>0$$

Also, if the distance from the bottom face of the fixed case 3 to the engagement surface of the resilient pawl 3l is H4, the thickness of the ear portion 5c of the base 5 is T6, the length of the threaded portion 9e is L4, and the distance over which the screw 9 attached to the fixed case 3 is movable is S5, then the length L3 of the cylindrical portion 9c plus the length L4 of the threaded portion 9e can be expressed as follows:

$$L2+L3=H3+H4+T4+T7+T6+S5$$

As a result of these relative dimensions, when the fixed case 3 and the base 5 are screw-fixed by the screws 9 onto the bracket 7b, the threaded portion 9e threads at its tip into the bracket 7b, firmly fixing the fixed case and the base 3 on the steering column 7. The base 5 and the steering column 7 are preferably of the same structure as those described in the first embodiment. The base 5 is integrated with the fixed case 3 by engaging an engaging portion 5d thereof with an engaging piece 3e of the fixed case 3.

The third embodiment of the present invention constructed as above is formed with resilient pawls 3l for engagement with the threaded portion 9e of the screw 9, and it is therefore possible to keep the screws 9 with the fixed case 3 and the base 5, similarly to the first and second embodiment stated above. Also, in the third embodiment, it is possible to prevent the screws 9 and resilient pawls 3l from being deformed or damaged due to external force applied thereto, because the head 9a, the spring washer 9b, and the flange 9a for the screw 9, as well as the resilient pawls 3l are contained in the first screw insertion hole 3h. Alternatively, the resilient pawls 3l may be provided in the second screw insertion hole 5a of the base 5, offering substantially equivalent effects.

The present invention having the structure described above and shown in the drawings provides the following advantageous effects:

(1) The first aspect of the invention comprises a rotary connector having a first screw insertion hole formed open for insertion of a screw therethrough, a fixed case for being mounted on a base for a switch, a flange formed in said screw, and a resilient pawl formed in the fixed case or the base for engagement with the flange. Therefore, the screws are prevented from falling out of the first and second screw insertion holes, and kept in the rotary connector. The rotary connector can be screw-fixed together with the base onto the steering column, thereby reducing the number of screws as well as the number of processes of tightening screws. This contributes to a reduction of manufacturing costs.

(2) The second aspect of the invention comprises a rotary connector having a first screw insertion hole opened for insertion of a screw therethrough, a fixed case for being mounted on a base for a switch, and a resilient pawl formed in the fixed case or the base for engagement with a threaded portion having threads formed in the screw. Therefore, the screws are kept in the rotary connector to simplify screw-fastening operations. Also, it is possible to transport the screws together with the rotary connector and the base, thereby eliminating the problem of controlling the screws.

(3) The third aspect of the invention further comprises an engaging piece formed in either one of the rotary connector or the base, an engaging portion formed in the other of the rotary connector and the base for engagement with the engaging piece, and a second screw insertion hole formed open in the base for insertion of the screw, the second screw insertion hole being provided in a same axis as that of the first screw insertion hole. Therefore, the rotary connector and the base can be screw-fixed at one time by the use of common screws onto the steering columns. It is also possible to temporarily attach the rotary connector onto the base, thereby facilitating screw-fastening operations in screw-fixing the rotary column and the base onto the steering column.

(4) The fourth aspect of the invention includes the flange comprising a washer inserted on a threadless cylindrical portion of the screw. Therefore, the screw is kept in the rotary connector with the washer engaged with the resilient pawl, thereby preventing the screw from falling by mistake during screw-fixing the rotary connector and the base onto the steering column.

(5) The fifth aspect of the invention includes a resilient pawl provided adjacent to or in the first screw insertion hole or the second screw insertion hole. Therefore, it is possible to engage the screw with the resilient pawl.

(6) The sixth aspect of the invention includes the screw having a head and a flange thereof positioned in the first screw insertion hole. Therefore, the screw is prevented at its head, flange, washer, and resilient pawl, and so forth, from being deformed or damaged by an external force.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

We claim:

1. A screw-fixed rotary connector structure for vehicles comprising:

a rotary connector comprising a fixed case having a first ear portion with a first screw insertion hole formed open therein for insertion of a screw therethrough;

a base for a switch on which said fixed case is to be mounted having a second ear portion, engaged with said first screw insertion hole, with a second screw insertion hole formed in said second ear portion for insertion of said screw; and a resilient pawl formed on said fixed case or said base for engagement with a portion of said screw, wherein the second ear portion of said base has a guide wall that guides an engagement of said base and said fixed case, and is formed as a second curvedly surfaced cutout, and a said first ear portion of said case includes a first curvedly surfaced cutout that engages with said second curvedly surfaced cutout.

2. A screw-fixed rotary connector structure for vehicles according to claim 1, wherein said screw (comprises a flange having a washer inserted on a threadless (cylindrical portion of said screw.

3. A screw-fixed rotary connector structure for vehicles according to claim 1, further comprising:

an engaging piece formed on either ore of said rotary connector or said base;

an engaging portion formed on the other of said rotary connector and said base for engagement with said engaging piece; and said second screw insertion hole being provided in a same axis as that of said first screw insertion hole of said rotary connector.

4. A screw-fixed rotary connector structure for vehicles according to claim 1, wherein said screw has a head and a flange thereof positioned in an enlarged portion of said first screw insertion hole.

5. The rotary connector structure according to claim 1, wherein said first screw insertion hole is sized and structured to accommodate a screw having a washer.

6. The rotary connector structure as set forth in claim 1, wherein said resilient pawl is provided in said second ear portion of the base.

7. The rotary connector structure as set forth in claim 6, wherein said resilient pawl is formed projecting from said second ear portion of said base in a manner surrounding the second screw insertion hole provided in the second ear portion.

8. A rotary connector structure for a vehicle, comprising:

a fixed case having a first screw insertion hole disposed on a planar surface of an ear portion extending from said fixed case for receiving a mounting screw;

a base having a second screw insertion hole in alignment with said first screw insertion hole for receiving said mounting screw; and a resilient pawl formed on one of said fixed case and said base for engaging a portion of said mounting screw to retain said mounting screw in said first screw insertion hole, wherein said base has a guide wall that guides an engagement of said base and said fixed case, and is formed as a second curvedly surfaced cutout, and said ear portion of said fixed case includes a first curvedly surfaced cutout that engages with said second curvedly surfaced cutout.

9. The rotary connector structure according to claim 8, wherein said resilient pawl engages with a flange provided on said mounting screw.

* * * * *